(12) United States Patent
King

(10) Patent No.: US 7,150,476 B2
(45) Date of Patent: Dec. 19, 2006

(54) SADDLE TEE AND TAP FOR IRRIGATION LINES

(75) Inventor: Thomas A. King, St. Louis, MO (US)

(73) Assignee: Blazing Products, Inc., Ballwin, MO (US)

( * ) Notice: Subject to any disclaimer, the term of this patent is extended or adjusted under 35 U.S.C. 154(b) by 94 days.

(21) Appl. No.: 10/619,093

(22) Filed: Jul. 14, 2003

(65) Prior Publication Data

US 2004/0113425 A1    Jun. 17, 2004

Related U.S. Application Data

(63) Continuation-in-part of application No. 10/138,715, filed on May 3, 2002, now Pat. No. 6,986,532, which is a continuation-in-part of application No. 10/138,711, filed on May 3, 2002, now Pat. No. 6,773,036.

(51) Int. Cl.
*F16L 5/00* (2006.01)

(52) U.S. Cl. .................................. 285/197
(58) Field of Classification Search ............. 285/197, 285/198, 199
See application file for complete search history.

(56) References Cited

U.S. PATENT DOCUMENTS

| 105,818 | A | * | 7/1870 | Lord ............................ 222/91 |
| 2,344,163 | A | * | 3/1944 | Misch .......................... 285/198 |
| 5,054,820 | A | * | 10/1991 | Lesquir et al. .............. 285/197 |
| 5,105,844 | A | * | 4/1992 | King, Sr. .................. 137/15.14 |
| 5,671,770 | A | * | 9/1997 | Rusche et al. .............. 137/318 |
| 5,694,972 | A | * | 12/1997 | King ........................... 137/318 |
| 5,964,241 | A | * | 10/1999 | King ........................... 137/107 |
| 6,216,723 | B1 | * | 4/2001 | King ........................... 137/318 |
| 6,510,865 | B1 | * | 1/2003 | King et al. ................. 137/318 |
| 6,767,033 | B1 | * | 7/2004 | King et al. ................. 285/197 |
| 6,773,036 | B1 | * | 8/2004 | King ............................ 285/5 |

\* cited by examiner

*Primary Examiner*—David Bochna
(74) *Attorney, Agent, or Firm*—Harness, Dickey & Pierce, P.L.C.

(57) ABSTRACT

A saddle tee and tap combination for making a fluid connection with an irrigation line in an irrigation system. The saddle tee includes a base having a passage therethrough, and a clamp thereon for engaging an irrigation line. The clamp holds the irrigation line in alignment with the passage, and compresses the irrigation line into an generally oval cross-section elongated in the direction of the axis of the passageway. The tap has a tip with a pointed end adapted to be inserted into the passageway so that the pointed end penetrates the wall of the irrigation line engaged in the clamp, in the direction of the elongation of the cross section.

58 Claims, 14 Drawing Sheets

SADDLE TEE AND TAP FOR IRRIGATION LINES

CROSS REFERENCE TO RELATED APPLICATIONS

This is a continuation in part of U.S. patent application Ser. No. 10/138,715, now U.S. Pat. No. 6,986,532 filed May 3, 2002 and U.S. patent application Ser. No. 10/138,711, now U.S. Pat. No. 6,773,036 filed May 3, 2002, the disclosures of which are incorporated herein by reference.

BACKGROUND OF THE INVENTION

This invention relates generally to a connector for an irrigation system and, in particular, to an improved saddle tee and tap for making connections with irrigation lines in an irrigation system.

Various types of connectors are used to make fluid connections with irrigation lines in an irrigation system. One such connector is a saddle tee, which can be used to make a connection anywhere along the length of the line, rather than just at one of the ends. Saddle tees allow taps to be inserted into the irrigation line, for example to connect a branch line to a main line, or to connect a sprinkler head or other device to a line.

Saddle tees were initially multi-piece devices secured onto an irrigation line with fasteners. Installation was difficult and time consuming, and often required tools. Examples of such saddle tees include those disclosed in U.S. Pat. Nos. 4,789,189, 5,095,564, and 5,104,844, incorporated herein by reference. Improvements have been made in saddle tees to reduce the number of parts, eliminate the need for separate fasteners, and make installation easier. The device disclosed in U.S. Pat. No. 5,694,972, incorporated herein by reference, is an example of such a device.

SUMMARY OF THE INVENTION

The saddle tee and tap of the present invention are adapted to be quickly and easily installed on a line in an irrigation system. Generally, the saddle tee of the present invention comprises a base having first and second ends, and a passageway therebetween, and a clamp on the second end for engaging the irrigation line generally in alignment with the passageway through the base. The clamp preferably compresses the irrigation line to elongate the cross-sectional profile in a direction aligned with the passageway in the base. The tap is adapted to be inserted through the passageway in the saddle tee, and into the irrigation line to make a fluid connection therewith. The tap has a tip that preferably terminates in a point for puncturing the irrigation line. There is a flange on the tip proximal to the point for engaging wall of the irrigation line.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
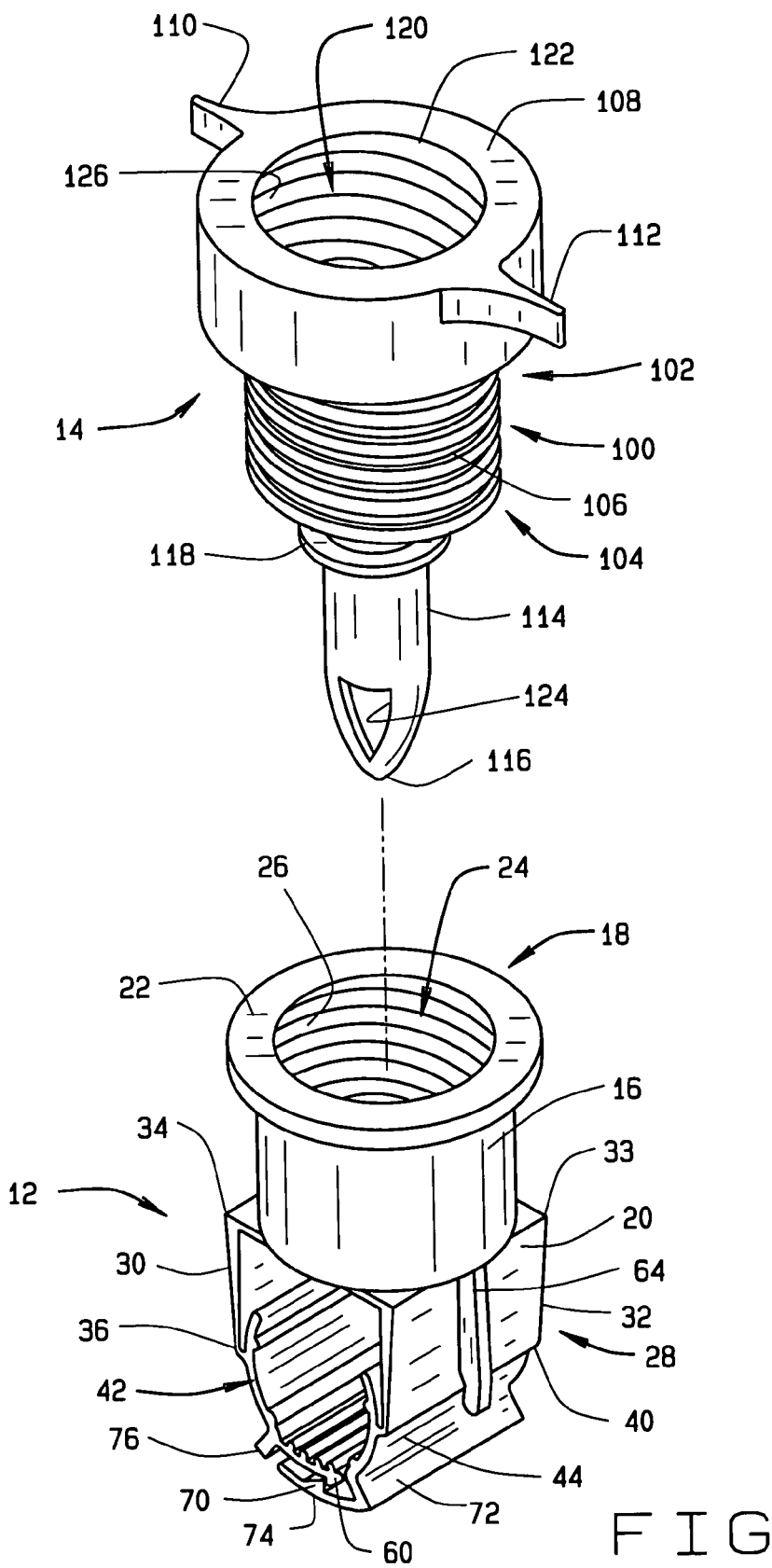
FIG. 1 is an exploded perspective view of a saddle tee and tap constructed according to the principles of the present invention.
Figure 2:
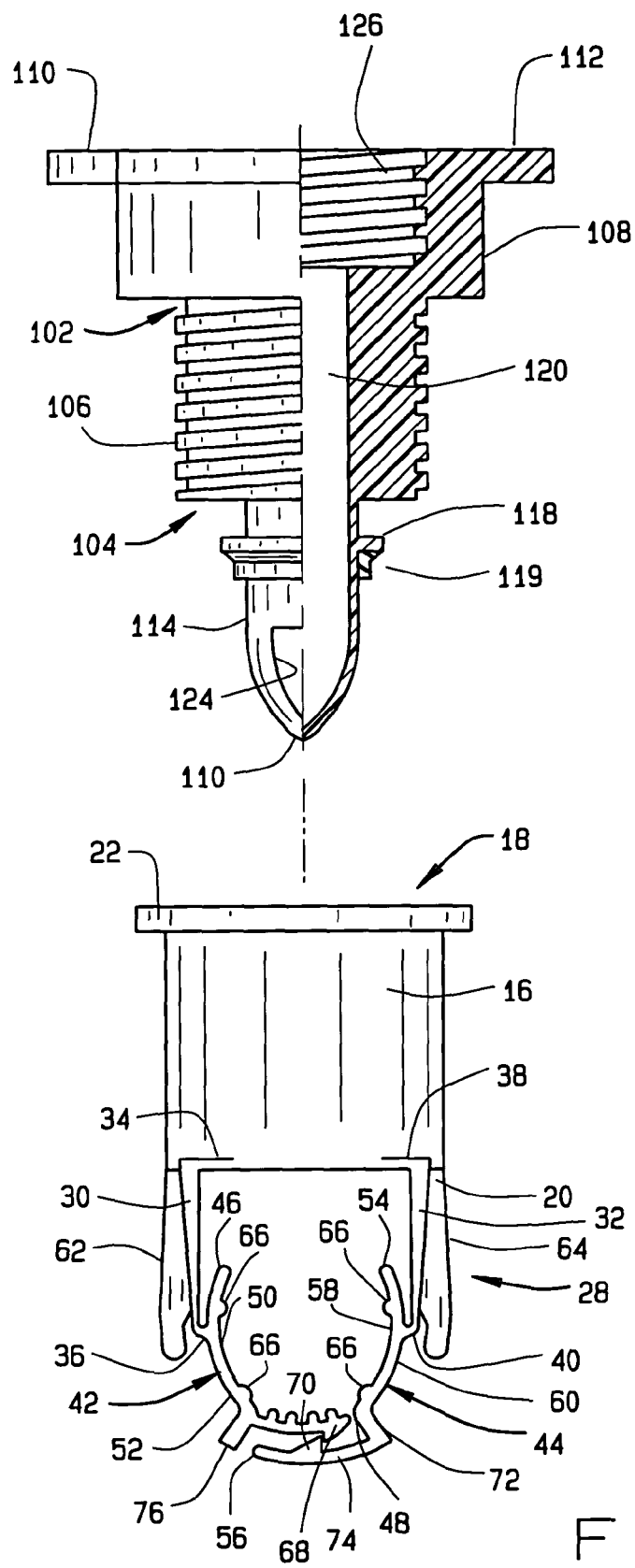
FIG. 2 is an exploded side elevation view of the saddle tee and tap, with the tap shown in partial cross section.

A saddle tee and tap constructed according to the principles of this invention are indicated generally as 12 and 14, respectively, in the Figures. As shown in FIGS. 1 and 2, the saddle tee 12 comprises a body 16, having first and second ends 18 and 20. A circular rim 22 projects from the body 16 adjacent the first end 18. A passage 24 extends through the body 16 from the first end 18 to the second end 20. The passage 24 preferably has internal threads 26.

There is a clamp 28 on the second end 20 of the body 16. The clamp 28 is adapted to engage and compress an irrigation line, holding the irrigation line in alignment with the passage 24. The clamp 28 comprises first and second arms 30 and 32 extending from the second end 20 of the body 16. The arm 30 tapers from its proximal end 34 adjacent to the body 16 to its distal end 36, and the arm 32 tapers from it proximal end 38 adjacent to the body to its distal end 40.

The clamp 28 further comprises jaws 42 and 44. Jaw 42 has a generally arcuate shape with first and second ends 46 and 48, and a concave inner surface 50 and a convex outer surface 52. Similarly, jaw 44 has a generally arcuate shape with first and second ends 54 and 56, and a concave inner surface 58, and an convex outer surface 60. The outer surface 52 of the first jaw 42 is hingedly mounted on the distal end 36 of the first arm 30, at a point intermediate the ends 46 and 48. Similarly, the outer surface 60 of the second jaw 44 is hingedly mounted on the distal end 40 of the second arm 32, at a point intermediate the ends 54 and 56. In this preferred embodiment the arms 30 and 32 are at least 0.5 inches long and are preferably between about 0.6 and 0.7 inches long. This length allows the irrigation line secured in the clamp to be spaced from the body 16, leaving the second end 20 of the body 16 open so that dirt and debris can fall through the passage 24, rather than accumulating in the passage and interfering with the insertion of tap 14 when used with either a ¾ inch i.d. line, or with a 1 inch i.d. line.

Ribs 62 and 64 are formed on the arms 30 and 32, and extend beyond the second ends of the arms to engage and stiffen the arms and limit the flexing of the jaws 42 and 44. One or more raised ridges 66 are formed on the inner surface 50 of first jaw 42 and on the inner surface 58 of second jaw 44. These ridges 66 engage the exterior of the irrigation line compressed between the jaws, helping to prevent the irrigation line from twisting in the clamp, and helping to ovalize the irrigation line in the clamp.

In the preferred embodiment the clamp 28 has a minor dimension L1 (shown in FIG. L1) between the jaws 42 and 44, and major dimension L2 (also shown in FIG. 7A) along the axis of the passageway 24 between the end 20 of the body 16, and the jaws. The major dimension L2 is preferably at least equal to, and preferably greater than, the outside diameter of the irrigation line L. The minor dimension L1 is preferably equal to, or less than, the outside diameter of the irrigation line. In a preferred embodiment the saddle tee 12 specifically adapted for a 1 inch i.d. (approximately 1.25 inch o.d) irrigation line L, the minor dimension L1 is about 1.2 inches and a major dimension L2 is about 1.3 inches. In a preferred embodiment of the saddle tee 12 specifically adapted for a ¾ inch i.d (approximately 0.9 inch o.d.) irrigation line L, the minor dimension L1 is about 0.8 inches and the minor dimension L2 is about 1.2 inches. The clamp 28 is preferably sized to compress the irrigation line L in one direction, and cause it to expand in another direction. This ovalization of the irrigation line helps make sure that the irrigation line is securely held in the clamp, and also helps ensure that the irrigation line has a sufficient dimension for effective penetration by a tap, which is important in smaller dimension irrigation lines such as ¾ i.d. inch lines, although less important in larger dimension lines, such as those greater than 1 inch i.d.

Figure 3:
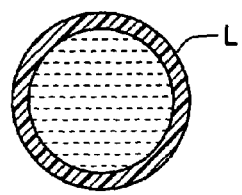
FIG. 3 is a transverse cross-sectional view an irrigation line.
Figure 5:
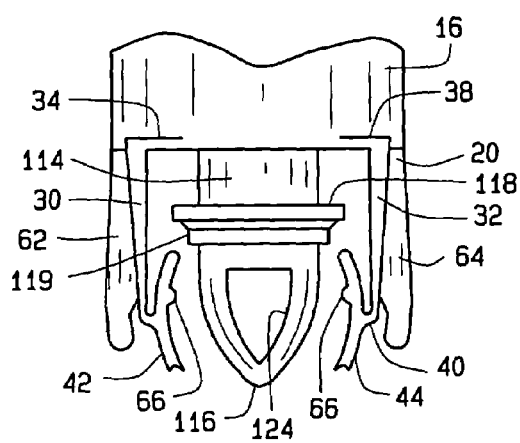
FIG. 5 is a partial side elevation view of the saddle tee shown with the tap partially extended.
Figure 6:
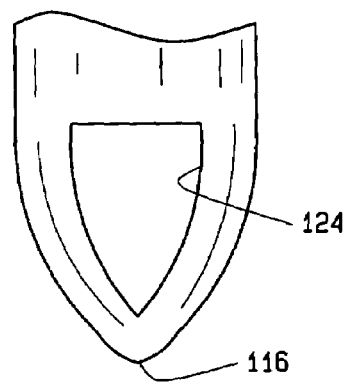
FIG. 6 is an enlarged partial side elevation view of the point on the distal end of the tap for piercing the irrigation line.

The jaws 42 and 44 are adapted to be secured together to engage and compress an irrigation line L (FIGS. 3, 7A, and 7B) between them. The first jaw 42 has a raised ridge 68 on its outer surface 52, adjacent the second end 48. The second jaw 44 has a raised ridge 70 on its inner surface 58, adjacent the second end 56. There is a shoulder 72 in the second jaw 44 that forms an offset portion 74 adjacent the second end 56 so that second jaw 44 can overlap the first jaw 42, and the ridge 68 on the first jaw 42 engage the ridge 72 on the second jaw 44. A tab 76 projects radially outwardly from the first outer surface 52 of the first jaw 42. The shoulder 72 and the tab 76 form surfaces that can be engaged by hand or by pliers, or a tool specially adapted for the purpose to draw the jaws 42 and 44 together to compress an irrigation line L between them and engage each other. The shoulder 72 and tab 76 also help stabilize the irrigation line L and saddle tee 12 from movement after burial.

The tap 14 comprises a generally cylindrical body 100, having first and second ends 102 and 104, and external threads 106. There is a generally cylindrical grip 108 at the first end 102 of the body 100. The grip 108 has wings 110 and 112 so that the tap can be grasped or engaged with a tool. There is a tubular tip 114 on the second end 104 of the body 100. The tip 114 preferably tapers to a point 116 at its distal end. For irrigation lines made of tougher material, such as polyvinylchloride, the radius of curvature of the point is greater than for relatively less tough materials such as polyethylene or polypropylene. In a preferred embodiment, the tip 114 tapers, at an increasing angle, tapering near zero degrees at its proximal end, and tapering at an angle of between about 55° and 60°, and preferably about 57.5° adjacent the point 116. As is know in the art, the end can be blunt, and still be able to weaken and pierce the wall of an irrigation line.

An annular flange 118 projects from the tip 114 intermediate its proximal and distal ends. A grommet 119 can be provided on the tip 114, adjacent the flange 118. Alternatively, instead of flange 118, a shoulder can be formed on the exterior of the tip 114 for engaging the irrigation line and supporting the grommet 119. This shoulder can be the shoulder formed between the tip 114 and the second end 104 of the body 100, as shown in FIG. 2. The grommet 119 preferably has a tapered exterior surface. The grommet 119 can be made from a resilient material to facilitate sealing the tip with the irrigation line. The flange 118 could be formed by the distal end of the threads 106, which can be constructed to compress the irrigation line L.

A passage 120 extends through the tap 14. A first end of the passage 120 opens at 122 in the grip 108, a second end of the passage 120 opens to windows 124 in the side of the tip 114, between the point 116 and the flange 118. A window 124 can also be provided in the distal end of the tip 114, particularly if a cutting member is provided on the tip 114.

In a preferred embodiment of this invention, there are two windows 124 on opposite sides of the tip 114. These windows 124 have an inverted triangle shape with a height of about 0.35–0.4 inches and a maximum width of about 0.25–0.3 inches. The vertical extent of the windows 124 allows the tee to be used with a range of sizes of irrigation lines from about 0.75 inches and about 2 inches. This vertical extent of the windows 124 ensures that some portion of the window 124 extends into the lumen of the irrigation line, yet the vertical extent is not so great that the window 124 bridges the inside and outside of the irrigation line. The windows are preferably large compared with the cross sectional area of the passage through the tip 114, 50 that the openings are sufficiently large to conduct fluid from irrigation lines, even when the line is sized such that the entire window does not penetrate the lumen. In a preferred embodiment, the windows each have an area of about 0.06 square inches or a total area of about 0.12 square inches, which is roughly equal to the internal area of the tip 114 (0.125 square inches for a 0.4 inch diameter).

Operation

In operation, the saddle tee 12 is secured on an irrigation line L at a point where it is desired to make a fluid connection with the irrigation line. The irrigation line is disposed between the hinged jaws 42 and 44. The user can grasp the jaws 42 and 44 with his or her hands to compress the irrigation line L between them and move the offset portion 74 of the second jaw 44 over the first jaw 42, until the ridges 68 and 70 engage each other and secure the jaws together. Alternatively, the user can use pliers or some other tool specifically adapted for that purpose can also be used to engage the shoulder 72 and the tab 76 to draw the jaws 42 and 44 together to secure them.

Figure 7A:
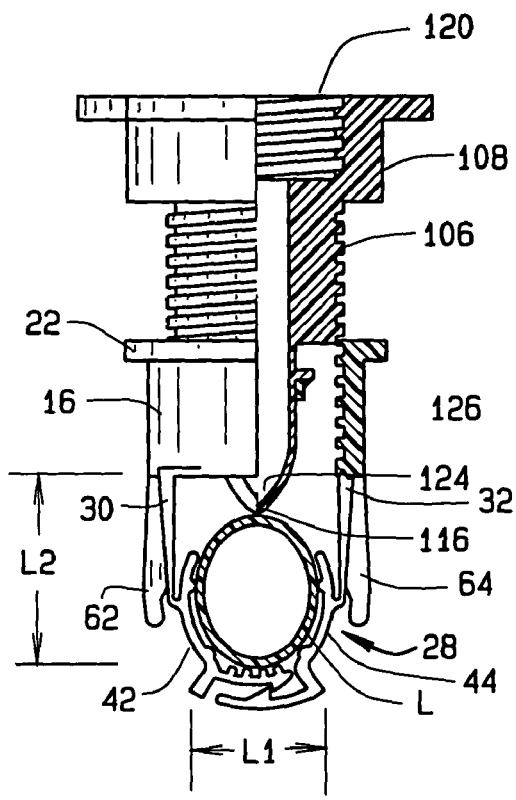
FIG. 7A is a transverse cross sectional view of the saddle tee and tap combination secured on an irrigation line, before the tap has made a fluid connection with the line.
Figure 7B:
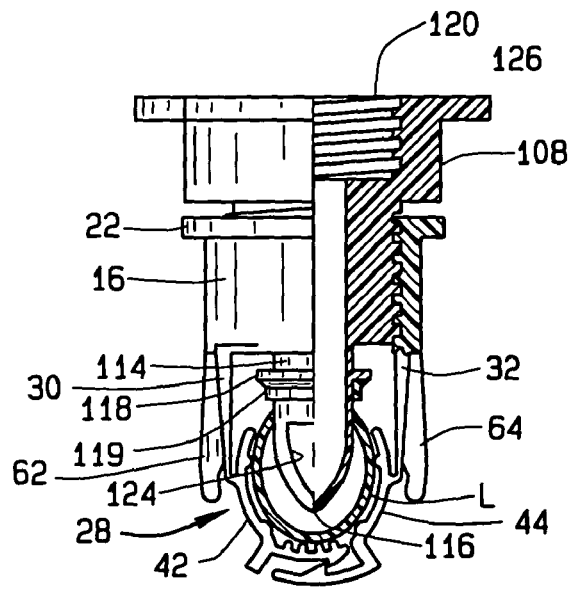
FIG. 7B is a transverse cross sectional view of the saddle tee and tap combination secured on an irrigation line, after the tap has been extended to make a fluid connection with the irrigation line.

As shown in FIGS. 7A and 7B, the jaws 42 and 44 preferably compress the irrigation line L between them so that the irrigation line assumes an oval cross sectional configuration, rather than its normal circular configuration (shown in FIG. 3), with a minor dimension between the jaws 42 and 44 (parallel to the minor dimension L1 of the clamp 28), and a major direction generally perpendicular thereto, and generally aligned with the passage 24 (parallel to the major dimension L2 of the claim 28). This is particularly advantageous in smaller diameter irrigation lines (i.e. those less than 1 inch i.d.). In larger diameter lines, the line is sufficiently large for the tap to penetrate without ovalization, although ovalization may be desirable to help ensure that the irrigation line is securely engaged in the clamp.

In the preferred embodiment the length of the portion of the jaws between their first ends and their hinged connection with their respective arms is about one third of the distance between the arms. Alternatively, in the preferred embodiment the length of the portion of the jaws between their first ends and their hinged connection with their respective arms is about 0.4 inches. This has a number of benefits, including allowing the first ends of the jaws to act as stops engaging the flange 118 on the tip 114 of a tap, as described below. The jaws 42 and 44 preferably substantially surround the irrigation line. In the preferred embodiment, the jaws preferably surround about ⅔ to about ¾ of the circumference of the irrigation line, leaving a portion of about ⅓ to about ¼ open to accommodate ovalization of the irrigation line.

Although not essential, the saddle tee is preferably configured so that pressing the saddle tee against the irrigation line with a force of more than about 30 pounds, draws the ends of the clamp together sufficiently to cause the latch members to engage each other.

The saddle tee 12 can be installed on the irrigation line L with the passage 120 oriented generally vertically, so that the tap 14 can be inserted into the irrigation line. However, the saddle tee 12 of the present invention is adapted to be mounted on the irrigation line L with the passage extending generally horizontally. This allows the line to be buried shallower, and helps reduce the incidence of the saddle tee and tap projecting above the surface of the ground.

Figure 4:
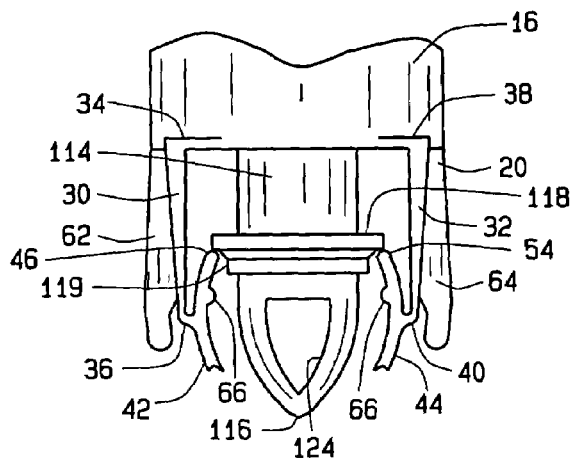
FIG. 4 is a partial side elevation view of the saddle tee shown with the tap extended.

The tap 14 is inserted into the irrigation line L by threading the threads 106 on the body 100 into the threads 26 in the passage 24. The wings 110 and 112 facilitate turning the tap 14. The point 116 on the tip 114 is advanced toward the irrigation line L. As shown in FIG. 7B, the tip 114 is advanced into engagement with the fluid line L so that the point 116 punctures the wall of the irrigation line, and the tip advances 116 until the flange 118 engages the outside of the wall of the irrigation line surrounding the puncture made by the point 116 of the tip 114. As shown in FIG. 4, the size of the flange 118 on the tip, and the size and position of the jaws 42 and 44 are preferably such that the flange 118 engages the ends 46 and 54 of the jaws, limiting the travel of the tap 14, and preventing the tip 116 from puncturing both sides of the irrigation line L.

The windows 124 of the tip 114 are disposed in the lumen of the irrigation line L, in fluid communication so that fluid in the line L can pass through the windows 124 and into the passage 120, to another irrigation line or to an irrigation device connected to the passage 120 with threads 126.

The saddle tee 12 holds the irrigation line L in proper alignment for connection with the tap 14. In the preferred embodiment, the saddle tee 12 also elongates the cross sectional profile of the irrigation line L in the direction in which the tap 14 pierces the line, to allow the tip of the tap to extend further into irrigation line, than would be possible if the irrigation line maintained its generally circular cross sectional profile. This also allows the saddle tee and tap to be used with irrigation lines of different sizes, the elongation of the smaller lines in particular preventing the tip 116 from puncturing both sides of the line.

The flange 118 helps compress the irrigation line, helping to retain in the irrigation line L in the clamp 28, and keeping the wall of the irrigation line even. The flange 118 also helps form a seal around the puncture formed by the tip 116. Thus a relatively larger clamp that is easier to secure around the irrigation line L can be used, and the tap 14, and particularly the flange 118 on the tip 114 of the tap 14, can help hold the irrigation line in the relatively looser clamp 28.

Thus, with the saddle tee and tip combination of the present invention, a connection can be quickly be made in an irrigation line at any point along its length. It is possible to make the connection without tools, although tools can be used to facilitate the connection process. The saddle tee and tap combination can allow a connection to be made in any orientation around the circumference of the line. By elongating the cross section of the irrigation line, the saddle tee and tap allow the tap to be inserted further into the irrigation line, making a more secure connection, and reducing the risk that the walls of the irrigation line will interfere with flow through the windows 124.

Figure 8:
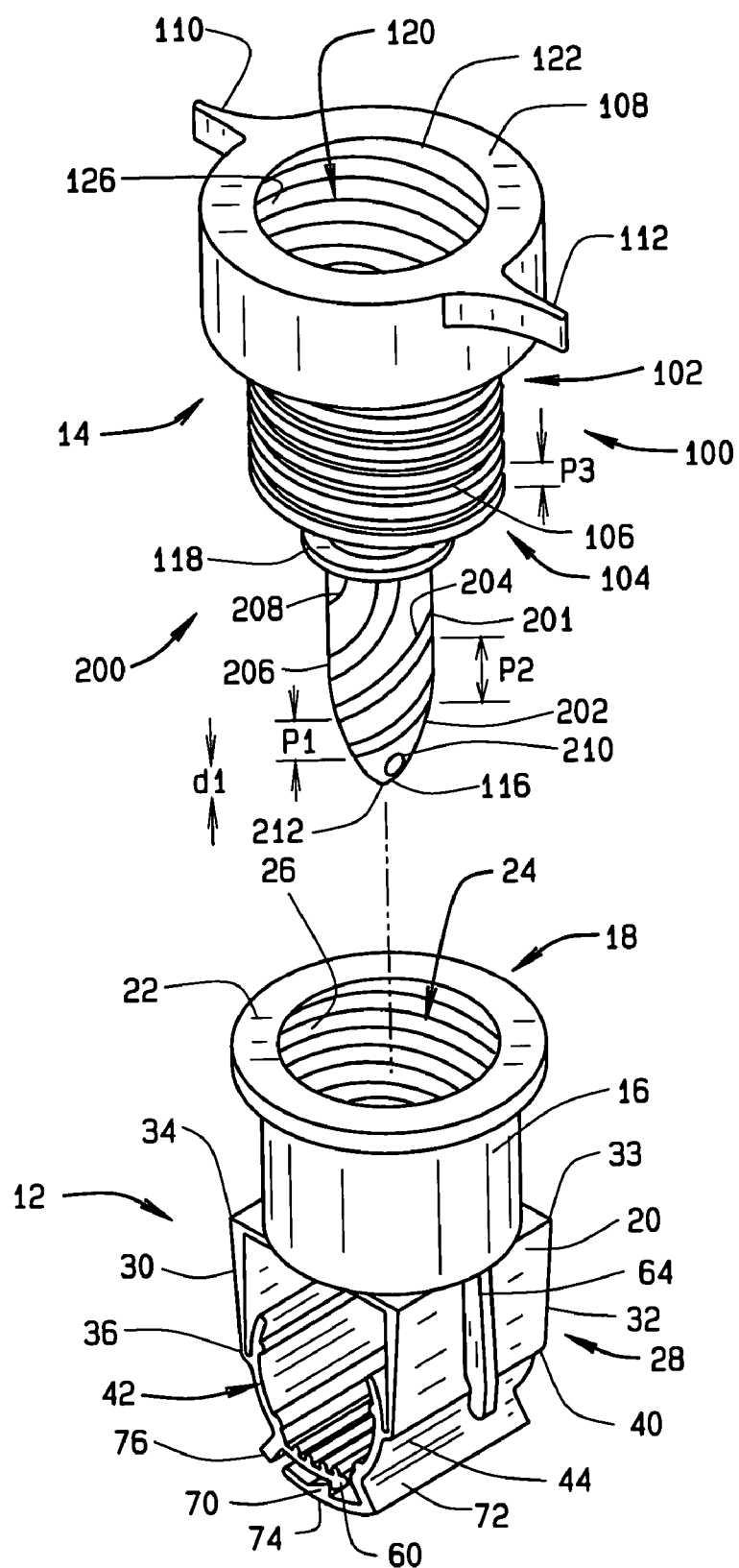
FIG. 8 is an exploded view of a saddle tee and tap constructed to the principles of the present invention.

Another preferred embodiment of a tap constructed according to the principles of this invention is indicated generally as 200 in FIG. 8. As shown in FIG. 8, the tap 200 is adapted for use with saddle tee 12, described above. The tap 200 is similar in construction to tap 14, described above, and corresponding parts are identified with corresponding reference numerals. However unlike the tip 114 on tap 12 tap 200 has a tip 201.

The tip 201 preferably terminates in a point 212 at the distal end, and has at least one window 210 therein, proximal to the point 212, communicating with passage 120 in the tap 200. The window 210 is preferably located distal to the threads on the tip 201, so that it is less likely to be occluded by the wall of the irrigation line. However the window 210 could be located amidst the threads, and/or multiple windows 210 can be provided.

The tip 201 preferably also includes at least one generally helical thread, and in this preferred embodiment shown in FIG. 8, includes four threads 202, 204, 206, and 208. The threads 202, 204, 206, and 208 preferably terminate a distance d1 from the point 212, leaving a portion of the tip 201 adjacent the point unthreaded.

The radius of curvature of the point 212, like point 116, can be selected to optimize penetration of a particular type of irrigation line material, or it can be selected to be able to penetrate a variety of the irrigation line materials typically encountered. Teeth or other cutting members can be provided to enhance the ability of the tap to penetrate the irrigation line.

The threads on the tip 201 can help the tip penetrate the irrigation line and/or engage and/or seal with the irrigation line. The threads may have a constant pitch, for example the pitch shown in portion P1 of the tip 200, which is preferably at least equal to the pitch of the threads 106 on the generally cylindrical body 100. Thus pitches are preferably selected so that the pitch of the threads on at least proximal portion of the tip adjacent the body 100 is less than the pitch of the threads 106 on the body 100. In this preferred embodiment the pitch of the threads on the tip 201 decreases from the distal end (where the pitch may be the same as or even greater than the pitch of threads 106) to the proximal end adjacent body 100, (where the pitch of the threads is preferably less than the pitch of the threads 106).

In operation, the tap 200 is used to make a fluid connection with an irrigation line by first installing a saddle, such as saddle 12 on the irrigation line, and then threading the tap into the passage 24, the external threads 106 on the body 100 engaging the internal threads 126 in the body 16. Turning the tap 200 causes the tap to advance toward the irrigation line. As the tap 200 advances in the saddle tee 12, the point 212 of the tip 201 impinges on the wall of the irrigation line until the threads on the tip (e.g. threads 202, 204, 206 and 208) contact the irrigation line. These threads engage the wall of the irrigation line, helping the point 212 to penetrate the wall.

Where the pitch of the threads on the tip 201 is generally the same as the pitch of the threads 106, the wall tip 201 penetrates the irrigation line at the same rate as the tap is advanced in the saddle. However, in another preferred embodiment, the threads on the tip have a smaller pitch than the threads 106 on the body, or more preferably the pitch of the threads varies and decreases to a pitch that is less than the pitch of the threads 106 on the body. Thus, after the threads penetrate the wall, they advance faster relative to the wall then the tap advances relative to the saddle tee 12, which pulls the wall proximally toward the proximal end of the tip 201, engaging and preferably helping to form a seal with the portion of wall surrounding the puncture, and also opening the line for greater flow.

Eventually, the tap 200 advances to a point where the grommet 119 (not shown) or the flange 118 abuts the irrigation line wall (or alternatively the shoulder between the tip 201 and the body 100). Additional turns of the tap 200 compress the grommet 119 between the wall of the irrigation line and the flange 118, thereby sealing the connection to the irrigation line. Because of the relative motion caused by the difference between pitches P1 and P3, the grommet 119 will be compressed more than the external threads 106 acting alone would cause. The result is a better seal for the tap 200.

In summary, the present invention provides a more capable and reliable seal of a tap to an irrigation line. The present invention also eases user fatigue while making the tap quicker than the prior art. The description of the invention is merely exemplary in nature and, thus, variations that do not depart from the gist of the invention are intended to be within the scope of the invention. Such variations are not to be regarded as a departure from the spirit and scope of the invention.

Another embodiment of a tap constructed according to the principles of this invention is indicated generally as 200 in FIG. 8. As shown in FIG. 8, the tap 200 is adapted for use with saddle tee 12, described above. The tap 200 is similar in construction to tap 14, described above, and corresponding parts are identified with corresponding reference numerals. However tap 200 is different from tap 14 in that unlike tip 114 on tap 14, the tip 202 distal to the flange 118 includes generally helical threads 204, and at least one window 210, and a point 212. The window 210 can be located proximal to, distal to, or within the threads. The window 210 is preferably located on an unthreaded portion of the tip 202, so that it will remain clear of debris from the threading of the tip through the irrigation line L.

The portion of the tip 202 adjacent the point 212 preferably is unthreaded for a distance d1 as shown in FIG. 8. As with point 116, the point 212 may have a radius of curvature selected to weaken and pierce irrigation lines made of any of a wide variety of materials. The point can have a radius optimized for a particular type (material and thickness) or irrigation line, or it can have a radius optimized for multiple different types of irrigation lines.

The tip threads 204 may have a constant pitch which can be smaller than, larger than, or the same as the pitch P3 of the external threads 106 on the body 102. The pitch of the tip threads 204 may be constant, or the pitch can vary, for example decreasing from the distal end toward the proximal end. Preferably, the pitch of the threads 204 decreases from the distal end, where the pitch is preferably greater than or equal to the pitch P3, to the proximal end, where the pitch of the threads 204 is equal to or less than the pitch P3.

In operation, the tap 200 is inserted into the irrigation line L by threading the threads 106 on the body 102 into the threads 26 in the passage 24. The threads 26 cause the tip 202 to advance, until the point 212 engages the irrigation line L. As the tap 200 advances further, the point 212 punctures the wall of the irrigation line L, thereby bringing the threads 204 into engagement with the irrigation line L. As the user continues to advance the tap 200 by turning it, the threads 204 begins to bite into the wall of the irrigation line.

Where the pitch of the tip thread 204 is the same as the pitch P3 of the external thread 106, the tip thread 204 advances the tip 202 through the wall at the same rate that the external threads 106 advance the body 102 through the saddle tee 12. Eventually, the tap 200 advances to a point where the grommet 119 (not shown) or the flange 118 abuts the irrigation line wall. Additional turns of the tap 200 compresses the grommet 119 between the wall of the irrigation line and the flange 118, thereby forming a sealing connection to the irrigation line L. As noted previously, instead of a flange 118, or a flange 118 and grommet 119, the shoulder formed between the bottom of the body 102 and the tip 202 may engage, and seal against, the wall of the irrigation line.

In embodiments in which the pitch P1 of the threads 204 is less than the pitch P3, the threads 204 draw the wall of the irrigation line L upwardly at a greater distance per turn of the body 16 than the threads 106 advance the body 16 relative to the wall of the irrigation line L. Thus, the threads 204 will pull the wall up against the flange 118 or the flange 118 and grommet 119 (not shown) according to the difference between the two relative movements. Because of the relative motion caused by the difference between pitches P1 and P3, the contact between the flange 118 or the flange 118 and grommet 119 will be greater than the external threads 106 acting alone would cause. The result is a better seal for the tap 200. As noted previously, instead of a flange 118, or a flange 118 and grommet 119, the shoulder formed between the bottom of the body 102 and the tip 202 may engage, and seal against, the wall of the irrigation line.

In the most preferred embodiment, the pitch of the threads 204 varies, such that the pitch P1 at the distal end of the tip thread 204 is smaller than a pitch P2 of the same thread 204 at a point more proximal than P1. Thus, the pitch of the tip thread 204 decreases toward the proximal end of the tip 202. The greater pitch of threads 204 at the distal end, more easily thread into and engage the wall of the irrigation line, while the small pitch of the threads at the proximal end pulls the wall of the irrigation line L upwardly faster than the tap advances toward the irrigation line. Thus, after the threads 204 starts threading into the wall, the connection to the irrigation line L is swiftly and surely completed with fewer turns than required with a constant pitch thread 204.

In one preferred embodiment, the tip threads 204 are configured to allow completion of the connection with the irrigation line L connection (from tip thread 204 engagement with the wall through to grommet 119 compression) with only two turns of the tap 200. Further, the decreasing pitch of the threads 204 also eases user fatigue.

Figure 9:
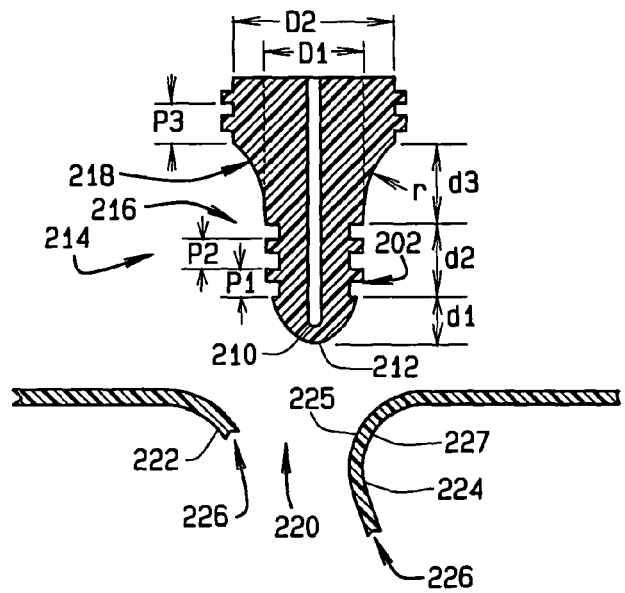
FIG. 9 is a cross-sectional view of another embodiment of a tap constructed to the principles of the present invention.

Another embodiment of a tap constructed according to the principles of this invention is indicated generally as 214 in FIG. 9. As shown in FIG. 9, the tap 214 is also adapted for use with saddle tee 12, described above. The tap 214 is similar in construction to tap 200 and corresponding parts are identified with corresponding reference numerals. The tap 214, like tap 200, has a tip 202. However, rather than threads 204, the tap 214 has threads 216, which comprise a distal section where the threads have a pitch P1, and a proximal section where the threads have a pitch P2.

The distal portion of the tap 214 has a diameter D1, and the proximal portion of tap has a diameter D2. The Diameter D1 includes the threads 216. The diameter D2 does not include the threads 106. The tip 202 of the tap 214 preferably has a distal end section of length dl that is unthreaded, an intermediate section containing the threads 216 of length d2, and a proximal section 218 of length d3.

As shown in FIG. 9, the proximal section 218 lies between the threads 216 and the external threads 106. Moreover, the diameter of section 218 increases from the proximal end of the threads 216 to the distal end of the external threads 106. As shown, the section 218 has a curved longitudinal cross-sectional, of radius r. However, the section 218 could have some other cross-sectional profile, for example one in which the diameter monotonically, parabolically, and exponentially increases. The contour could also be that of a straight line, a catenary curve, a trigonometric curve, or any other type of curve.

In operation, the increasing diameter of the section 218 ensures that the wall of the irrigation line L will remain smooth and capable of forming a pressure tight seal with the tap 214 as follows. As the tap 214 advances, the blunt or flattened tip 212 first weakens, then punctures, the wall irrigation line L. In practice, it has been found that the puncture results in an irregular rupture 220 of the irrigation line L wall. Generally, the rupture is defined by a ridge, or rim, 226. One or more areas of the ridge 226 are shorter than other areas where the ridge 226 is more pronounced. These shorter and longer areas of the ridge 226 are designated as 222 and 224, respectively. The ridge has an exterior surface 225 and an interior surface 227.

It has been found in operation that the puncture may also result in two other particular types of ruptures 220. The first of these types of ruptures 220 is defined by a coupon. The coupon is a roughly disc shaped piece of the irrigation line wall formed during the puncture. These coupons remain hingedly attached to the irrigation line wall generally along a small arc, but are pushed out of the way as the tip 212 advances into the irrigation line L. Whether the tip 202 includes cutting teeth, a cutting member, or has blunt tip, the tip 202 may still create a coupon. For PVC, it has been found that a blunt tip 202 terminating in a point with a radius of curvature greater than 0.05 inches, and more preferably 0.1 inches forms the desired coupon. By creating the coupon, cracking in the wall of the irrigation line is reduced, if not eliminated, thereby allowing a better seal between the wall and the tap 214. For PVC, the reduction in cracking is particularly important because of the more brittle nature of PVC (as compared to other commonly used irrigation line materials).

The other type of rupture 220 that may result is defined by a ridge 226 with a wavy or crenulated profile. See FIGS. 10 and 11. While the profile may be noted in FIG. 10 where the ridge 226 is seen surrounding the tap 214, FIG. 11 shows the profile with more clarity. FIG. 11 shows the an exemplary ridge 226 as if it had been cut from the irrigation line L and laid flat. As shown on the exemplary ridge 226 in FIG. 11, there are troughs 230 having a generally rounded, sinusoidal or catenary shape, and peaks or apexes 232 with an angular quality, or pinched shape. It may also be noted that the peaks tend to occur on a line with the tip 212 parallel to the direction of the irrigation line.

Figure 10:
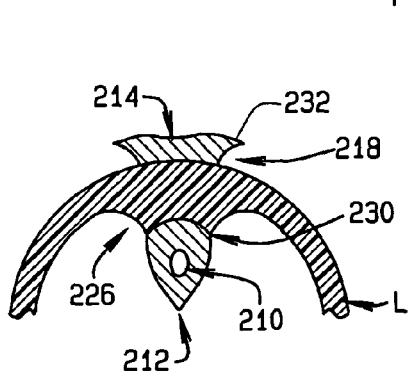
FIG. 10 is a cross sectional view of the tap of FIG. 9 as it punctures the wall of an irrigation line.
Figure 11:
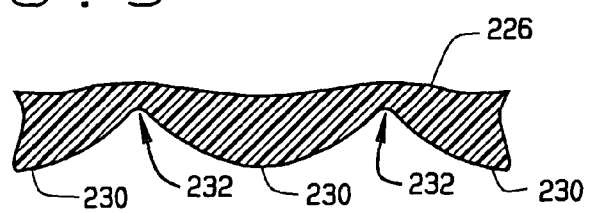
FIG. 11 is a cross-sectional view of the wall of an irrigation line as it is punctured by a tap constructed according to the principles of the present invention.

FIG. 10 shows the tip 212 after it has advanced through the rupture 220. As noted previously, any of the embodiments of the present invention, the taps (e.g., tap 14, tap 52, tap 200, or tap 214) may be sized so that a single tap may create a connection to an irrigation line of any of a range of sizes so that inventories of different sizes of taps do not have to be maintained. For most applications, taps and saddles that accommodate irrigations with outer diameters of between about 0.75 inches and about 2 inches are adequate.

With reference again to FIG. 9, as the tap continues to advance, the tip threads 216 advance through the rupture 220 while continuing to turn. As the threads 216 turn, the tip threads 216 tend to rub against the exterior surface 225 of the wall projection. The rubbing, accordingly, causes striations on the surface of the exterior surface 225. In turn, with the irrigation line filled with water, the striations can increase the occurrence of leaks around the tap 214.

However, the smooth surface and increasing diameter of the section 218, stretches the opening in the irrigation line, smoothing striations and surface defects formed during the initial penetration of the irrigation line. Moreover, the increasing diameter of the section 218 forms a self energizing seal with the irrigation line L. The seal with the increasing diameter of the section 218 tightens as the irrigation line expands. It should be noted that the shoulder 218 may be included in taps in accordance with the present invention which do not have the threads on their tips. The contour or a portion of the contour of the section 218 may be shaped to complement the contour of the exterior surface 225. In addition a grommet (not shown) may be used in conjunction with the section 218.

In operation, when the irrigation line L is filled with water under pressure, nominally 50 psig, this pressure increases the contact between the wall of the irrigation line and the section 218, energizing the seal between the exterior surface 225 and the shoulder 218. Such pressure energized seals enjoy the advantage of high internal line pressure creating a corresponding increase in the sealing pressure acting on the seal. The net result is a tap 214 with superior sealing characteristics.

Figure 12:
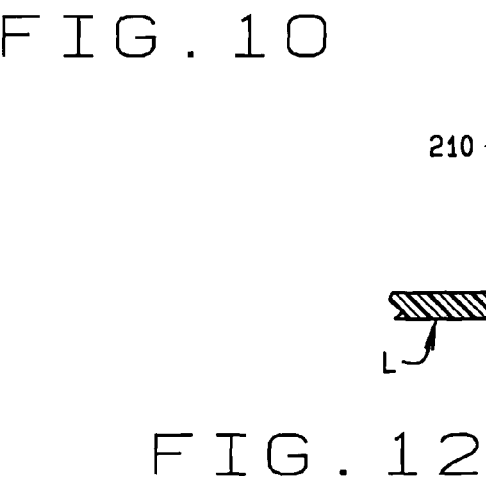
FIG. 12 is a cross-sectional view of another embodiment of a tap constructed according to the principals of the present invention as it punctures an irrigation line.

Another embodiment of a tap constructed according to the principles of this invention is indicated generally as 234 in FIG. 12. The tap 234 is similar in construction to the other taps described and illustrated herein, and corresponding parts are identified with corresponding numbers. The tap 234 includes at least one window 210, a cutting member 236 having a sharp edge 238 on the distal end of the cutting member 236. The cutting members 236 generally replace the tip 212. In the alternative, while FIG. 12 shows a single cutting member 236 in cross section, it will be understood that the tap 234 may include multiple cutting members, each extending only part of the way around the circumference of the distal end of the tap 234. Either the inside or the outside, or both sides (as shown), of the cutting member 236 may include a bevel to bring the edge to a sharp knife-like edge.

In operation, the tap 234 turns as it advances toward and through the irrigation line wall. Because of the sharp edge 238, the cutting member 236 first scores, then begins cutting the irrigation line wall. Eventually, the cutting member 236 succeeds in penetrating the irrigation line wall on at least one side of the tap 234. Typically, a coupon 240 is formed which pivots aside to allow the tap 234 to advance into the irrigation line L.

Figure 13:
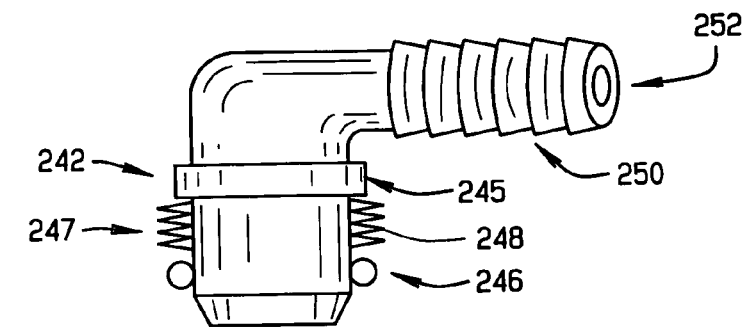
FIG. 13 is an exploded view of a tap and a connector constructed according to the principles of another embodiment of the present invention.
Figure 13:
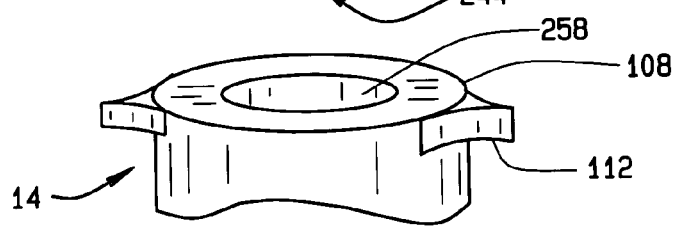
Figure 19:
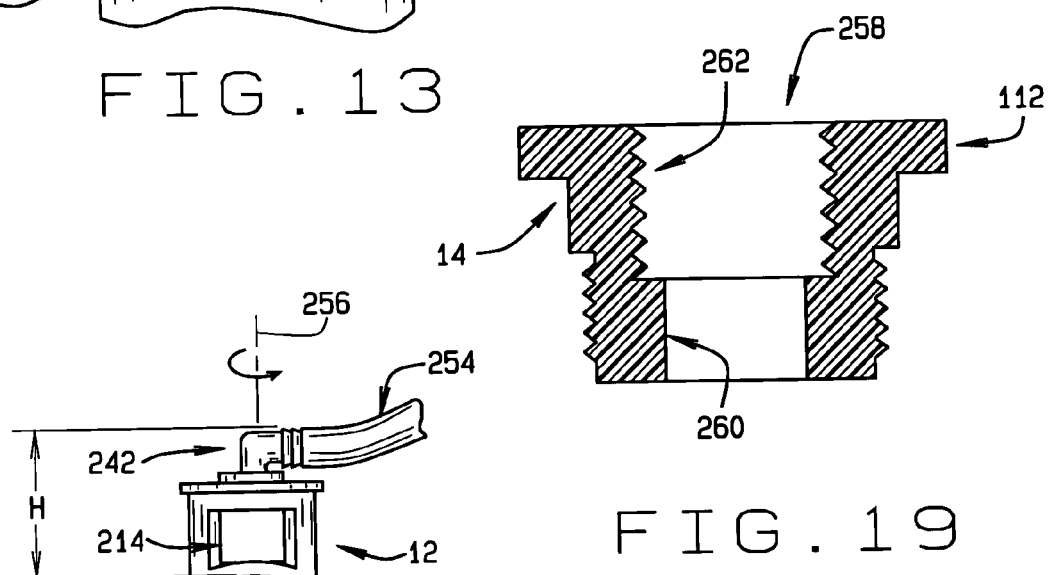
FIG. 19 is a cross-sectional view of the saddle tap of Figure FIG. 13 to show construction details.
Figure 14:
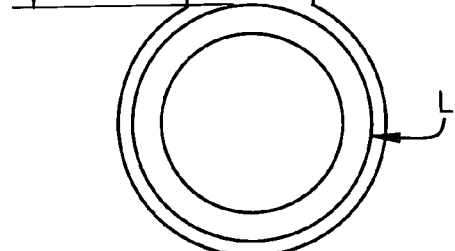
FIG. 14 is a transverse cross-sectional view of the connector and tap of FIG. 13 installed in an irrigation system.
Figure 15:
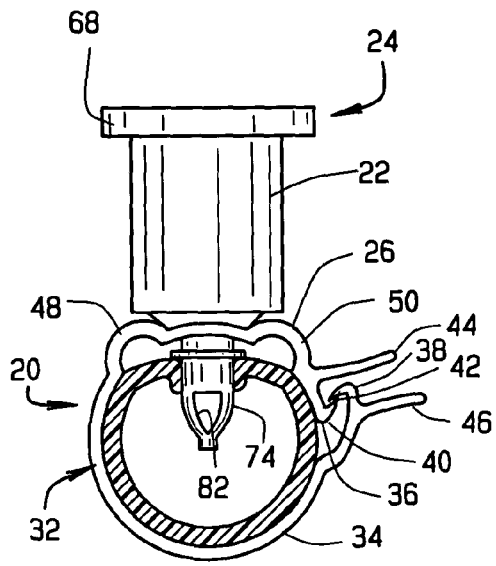
FIG. 15 is a vertical cross-sectional view through an irrigation line with which a connection has been made with the saddle tee and tap of another embodiment.
Figure 16:
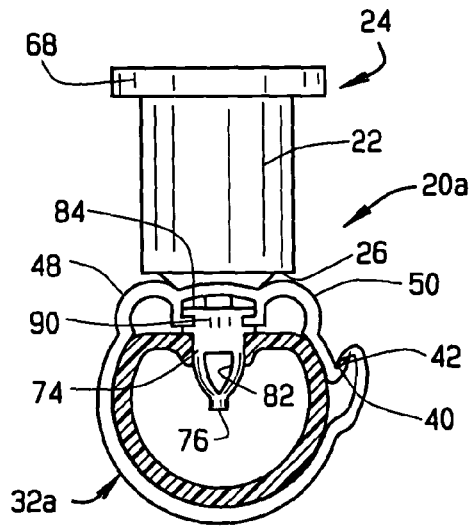
FIG. 16. is a vertical cross-sectional view of an irrigation line with which a connection has been made with the saddle tee and tap of another embodiment.

Turning now to the connection of a branch line, sprinkler, or other irrigation device to the tap, reference is now made to FIGS. 13 and 14. Another embodiment of the present invention includes a space saving connector 242 to be inserted into an opening 258 of a tap to make a fluid connection therewith. This connector can be used with any tap, including any of the embodiments disclosed herein.

As shown, the opening 258 in the tap preferably has a stepped cross section, with a smaller smooth walled section 260 for making a sealing connection with the connecter 242, and a larger, threaded section 262 for threadedly engaging the connector 242.

Generally, the connector 242 has first and second end, the first end includes a distal end section 244, having an o-ring 246 (or other sealing device), a threaded proximal end section 247, having threads 248, and retaining ring 245. The second end includes a series of barbs 250 for engaging the interior of a branch line 254. To connect the branch line 254, the first end is inserted into the opening 258 in the tap. The o-ring 246 seals in the opening 258 along the smooth walled section 260, and the threads 248 engage the threads in the opening.

In the preferred use of the connector, the saddle is mounted on the irrigation line so that it extends generally laterally. The tap is inserted through the saddle into the irrigation line, so that the opening 258 is oriented generally laterally. The connector 242 on the end of branch line 254 is threaded into the opening 258 in the tap in the saddle. By orienting the saddle and the tap horizontally, rather than vertically, the irrigation line does not have to be buried as deeply. The 90° elbow in the connector 242 ensures that the branch line 254 extends vertically for connection to an irrigation sprinkler or another irrigation line. The threaded, sealed connection between the connector 242 and the tap allows the connector 242 to rotate about an axis 256 relative to the tap. Accordingly, the connector 242 and tap 234 combination (shown in FIG. 14) provides the user considerable flexibility in where to locate irrigation devices with respect to the connection to the irrigation line L.

Additionally, the combination provides a connection to the irrigation line L with a small overall height H, in some embodiments as low as 2". It should also be noted that the irrigation line is frequently installed by pulling the line through the ground (i.e. underground). Since the combination requires the irrigation line to have only a 2" clearance with the surface of the ground, pulled installations are much easier. Additionally, where the irrigation line is installed by trenching, a side mounted combination (projecting horizontally off of the irrigation line) allows for little, if any, additional trenching to make the connection.

Figure 17:
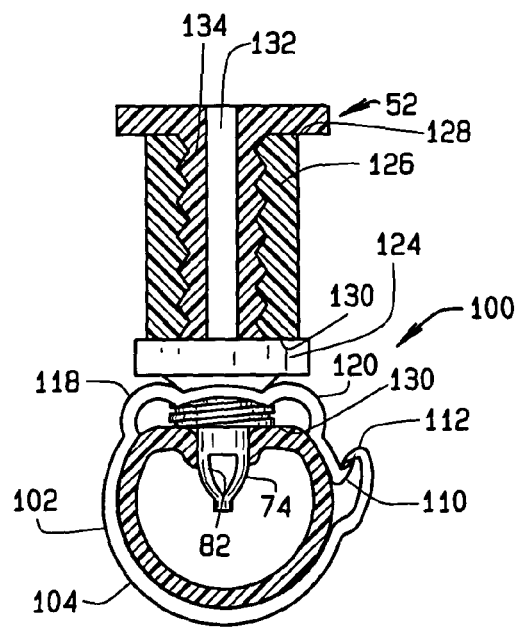
FIG. 17 is a vertical cross-sectional view of an irrigation line with which a connection has been made using the saddle tee and tap of another embodiment, and with portions of the saddle tee in cross-section to show details of construction.
Figure 18:
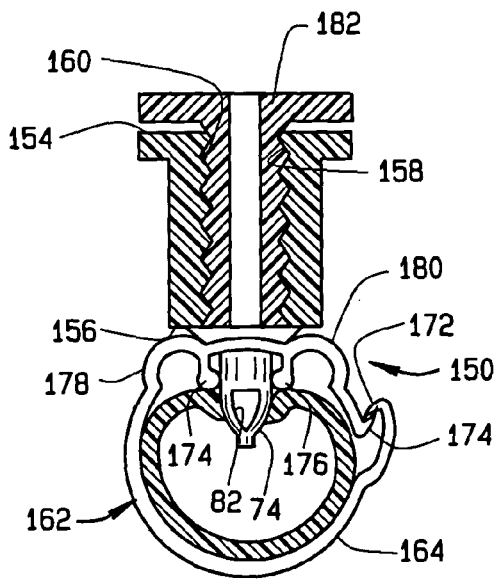
FIG. 18 is a vertical cross-sectional view of an irrigation line with which a connection has been made using the saddle tee and tap of another embodiment, and with portions of the saddle tee in cross-section to show details of construction.

Referring now to FIGS. 15, 16, 17, and 18, a further advantage of the present invention may be seen therein. With particular reference to FIG. 17, the second end 130 can be seen engaging and compressing the irrigation line L to a substantially flat surface. Likewise, in FIG. 16, insert 90 can be seen therein tightening the clamp on the irrigation line L and also creating a substantially flat surface on the irrigation line L. Similarly, the flange 78 can be seen compressing the irrigation line L into a substantially flat surface in FIG. 15. FIG. 18 similarly shows the cam members 174 and 176 compressing the irrigation line L into a substantially flat surface. Moreover, as noted therein, the grommet can engage, compress, and seal with the wall of the irrigation line L.

Thus various embodiments of the present invention can compress the irrigation line L to a flat surface to facilitate the formation of a sealed, fluid tight connection between the tap and the irrigation line. The localized flattening of the generally cylindrical irrigation achieves a better seal than without the flattening. For PVC pipe in particular, the flattening of the line markedly helps the grommet 118 seal the connection. Though, the effect also occurs with lines of other materials.

Figure 20:
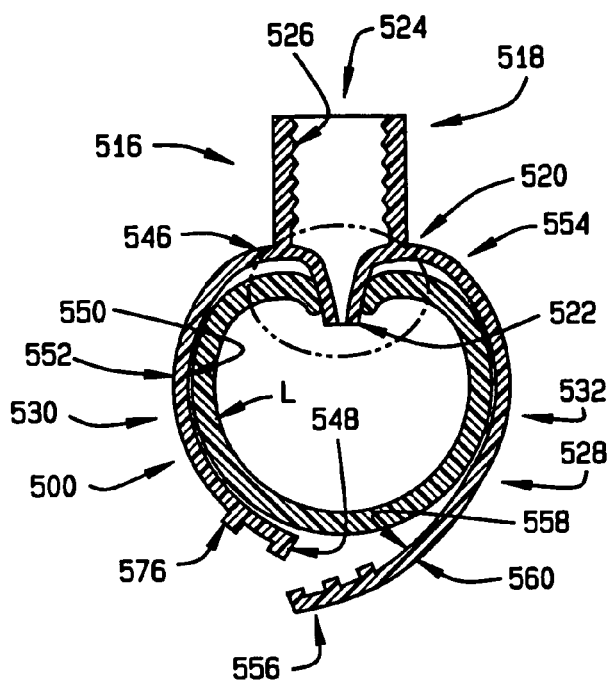
FIG. 20 is a side elevation view of a saddle tee constructed to the principles of the present invention.
Figure 21:
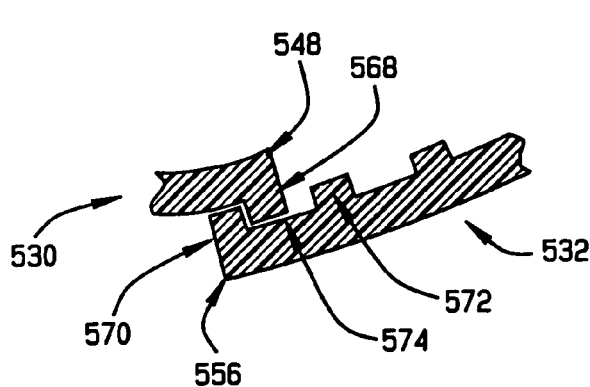
FIG. 21 is a detail view of the saddle tee of FIG. 20.

Another embodiment of a saddle tee in accordance with the principles of this invention is indicated generally as 500 in FIG. 20 and FIG. 21. The saddle tee 500 comprises a body 516, having first and second ends 518 and 520. A tip 522 extends from the second end 520. A passage 524 extends through the body 516 from the first end 518 to the second end 520 and through the tip 522. The portion of the passage 524 adjacent the first end 518 preferably has internal threads 526 for receiving a tap or connector.

There is a clamp 528 on the second end 520 of the body 516. The clamp 528 is adapted to encircle and engage irrigation line, holding the tip 522 in an opening formed in the irrigation line. The clamp 528 comprises first and second jaws 530 and 532 extending from the second end 520 of the body 516. The jaw 530 has a generally arcuate shape with first and second ends 546 and 548, and a concave inner surface 550 and a convex outer surface 552. Similarly, jaw 532 has a generally arcuate shape with first and second ends 554 and 556, and a concave inner surface 558, and a convex outer surface 560.

The jaws 530 and 532 are adapted to be secured together to engage an irrigation line L between them. The first jaw 530 has at least one raised ridge 568 on its outer surface 552, adjacent the second end 548. The second jaw 532 has at least one raised ridge 570 on its inner surface 558, adjacent the second end 556. There is a shoulder 572 in the second jaw 532 that forms an offset portion 574 adjacent the second end 556 so that second jaw can overlap the first jaw 542, and the ridge 568 on the first jaw engage the ridge 570 on the second jaw. A tab 576 projects radially outwardly from the first outer surface 552 of the first jaw. The shoulder 570 and the tab 576 form surfaces that can be engaged by hand or by pliers, or a tool specially adapted for the purpose to draw the jaws 530 and 532 together to compress an irrigation line L between them and engage each other.

Figure 22:
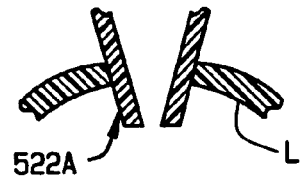
FIG. 22 is a partial cross-sectional view of a first tip configuration for the saddle tee of FIG. 20.
Figure 23:
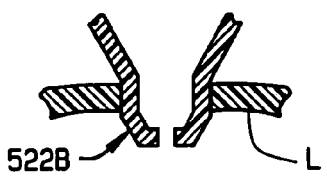
FIG. 23 is a partial cross-sectional view of a second tip configuration for the saddle tee of FIG. 20.
Figure 24:
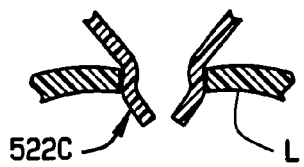
FIG. 24 is a partial cross-sectional view of a third tip configuration for the saddle tee of FIG. 20.

Four embodiments of the tip 522 are adapted to fit in a preformed hole in the irrigation line L. As shown in FIG. 22 the tip 522A can be made so that it is more rigid than the material in the wall of the irrigation line, and when forced into the hole, the tip compresses the wall of the irrigation line to seal therewith. As shown in FIG. 23, the tip 522B can be made so that it is less rigid than the material in the wall of the irrigation line, and when forced into the hole, the tip compresses, forming a seal therewith. As shown in FIG. 24, the tip 522C and the irrigation can be made of compressible materials, and both the tip and the irrigation line deform to form a seal therebetween. Finally, as shown in FIG. 25, a gasket or grommet 578 can be provided to form a seal between the tip 522D and the irrigation line.

In operation, a hole is formed in an irrigation line, such as with a drill. The tip 522 of the saddle 500 is aligned with the hole, inserted into the hole, and forced into the hole to seal therewith. The clamp 528 is secured by securing the jaws together. A fluid connection is easily made by inserting a tap or other connection into the passage 524. The tap or connector can engage the threads 526.

A particular problem with saddle tees and taps of the prior art occurs because of the twisting action required to insert the tee into the tap. These prior art saddle tees and taps employ mating threads which propel the tee through the irrigation line wall as the user twists the tee. Disadvantageously, the twisting necessary for engaging the threads imparts a torque or moment on the saddle tee. The torque tends to release the clamp of the saddle tee thereby foiling the attempted connection. Such failures waste time, frustrate the user, and tend to damage the clamp thereby wasting material. In contrast, the absence of twisting forces on the saddle tees in accordance with the present invention (during installation) allows for a much simpler clamp as compared to the prior art saddle tees.

Figure 25:
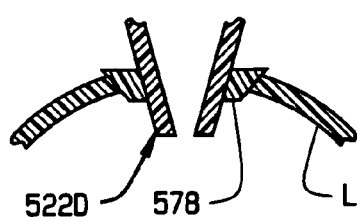
FIG. 25 is a partial cross-sectional view of a fourth tip configuration for the saddle tee of FIG. 20.

Turning now to FIGS. 23 to 25, in another preferred embodiment of the present invention, a no-twist saddle tee and tap for making a connection with an irrigation line is shown. The saddle tee 612 includes a body 616 with a first end 618 and a second end 620 and a passageway 624 between the ends which includes a slot 640. The first end 618 includes a clamp 628 to secure the saddle tee to the irrigation line L. The tap 614 includes a proximal end 642 having a fitting 644 for making the connection and a distal end 646 adapted to puncture the wall of the irrigation line L.

A passageway 648 extends between the proximal and distal ends 642 and 646. The tap 614 also includes a tab, or stub, 650 adapted to lock in the slot 640 to lock the tee 614 in the first passageway 624 when the user pushes the tap 614 into the first passageway 624. Additionally, the first passageway 624 may include a guide hole 652 to guide the distal end 646 to the irrigation line L wall. Moreover, the distal end 646 may include a cutting member 654 to aid in puncturing the irrigation line L wall.

In practice, the user secures saddle tee 612 to the irrigation line L using the clamp 628. Then the user brings the distal end 646 of the tap 614 into proximity with the passageway 624 of the saddle tee 612. Next the user aligns the tab(s) 650 with the slots 640. By then pushing down on the top of the tap 614, the user advances the tap 614 through the passageway 618. As the tap 614 advances, the distal end 646 may engage the guide hole 652. Also, as the tap 614 advances, the tab 650 and slot 640 lock in a manner similar to that of a bayonet fitting 651 thereby locking the tap 164 into the tee 612. In the alternative, the slot 640 may be configured so that a slight turn of the tap 614 lodges the tab 650 under a lip or ledge (not shown) of the slot thereby removably locking the tap 614 in the tee 612. Additionally, the distal end 646 engages and punctures the wall thereby providing a fluid path from the interior of the irrigation line L to the proximal end 642 via the passageway 648. To complete the connection, the user connects a branch line to the fitting 644 which may preferably be either a ½ or ¾ female pipe thread fitting.

Thus the present invention provides a low profile saddle tee and tap which allows a connection to be made while imparting no twist on the clamp of the saddle tee. Additionally, the guide hole allows the user to quickly align the tee and tap so that the user may concentrate on puncturing the wall with the distal end rather than stabilizing the tap on the wall. Moreover, the cutting member may aid the user in puncturing the wall with less effort than with prior art taps. Also, the locking tab and slot ensure that the tap will remain in the tee despite the pressure in the irrigation line L.

Figure 26:
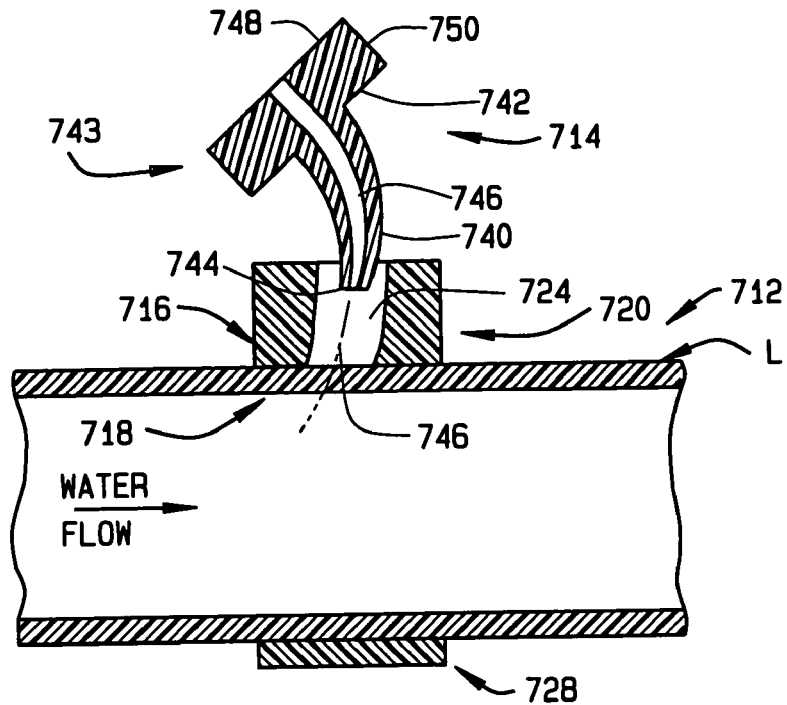
FIG. 26 is a longitudinal cross sectional view of a preferred embodiment of a saddle tee and tap in accordance with the principles of the present invention.

In another preferred embodiment, as shown in FIG. 26, another no-twist saddle tee and tap is provided. The current saddle tee 712 also includes a body 716 with a first end 718 and a second end 720 and a passage 724 therebetween. The first end 718 includes a clamp 728 to secure the saddle tee to the irrigation line L. The tap 714 includes a curved member 740 with a proximal end 742, a distal end 744, an internal passageway 746 therebetween, and a handle 750 on the proximal end 742. The passageway 724 is curved to guide the curved member 740 so that the distal end 744 punctures the irrigation line wall as the user pushes on the handle 750 in a direction generally indicated by the arrow 743.

In operation, after securing the saddle tee 712 to the irrigation line L, the user brings the distal end 744 of the tap 714 into close proximity with the passageway 724 near the second end 720. As the user pushes generally to the right (as seen in FIG. 26) the passageway 724 guides the curved member 740 toward the irrigation line L wall. As with the prior embodiment a locking tab and slot (not shown) may be included on the saddle tee and tap to lock the tap into the tee as the tap advances through the passageway.

As the tap 714 advances through the passageway 724, the curved wall 746 of the passageway 724 acts like the fulcrum of a lever by multiplying the force of the user pushing to the right on the tap 714. Accordingly, the distal end 744 exerts a relatively large force on the wall and thus punctures the wall with relative user ease. To complete the connection the user connects a branch line to the tap 714 at the fitting 748 which may preferably be a ½ or ¾ inch female pipe thread fitting. Preferably, the passageway may be configured so that the handle 750 (starting at one side of the body 716) may travel either to a position above the second end 720 or on the other side of the body 716 as the user pushes the handle 750 to puncture the wall with the distal end 744.

Accordingly, the present embodiment provides another low profile, no-twist saddle tee and tap. Moreover, because the distal end 744 may substantially point into the flow of water in the irrigation line L, a low turbulence connection may be made to the irrigation line l. Thus, the pressure drop of the water as it enters the passageway 746 in the curved member 740 and flows through the curved member 740 is low compared to the prior art taps.

Figure 27:
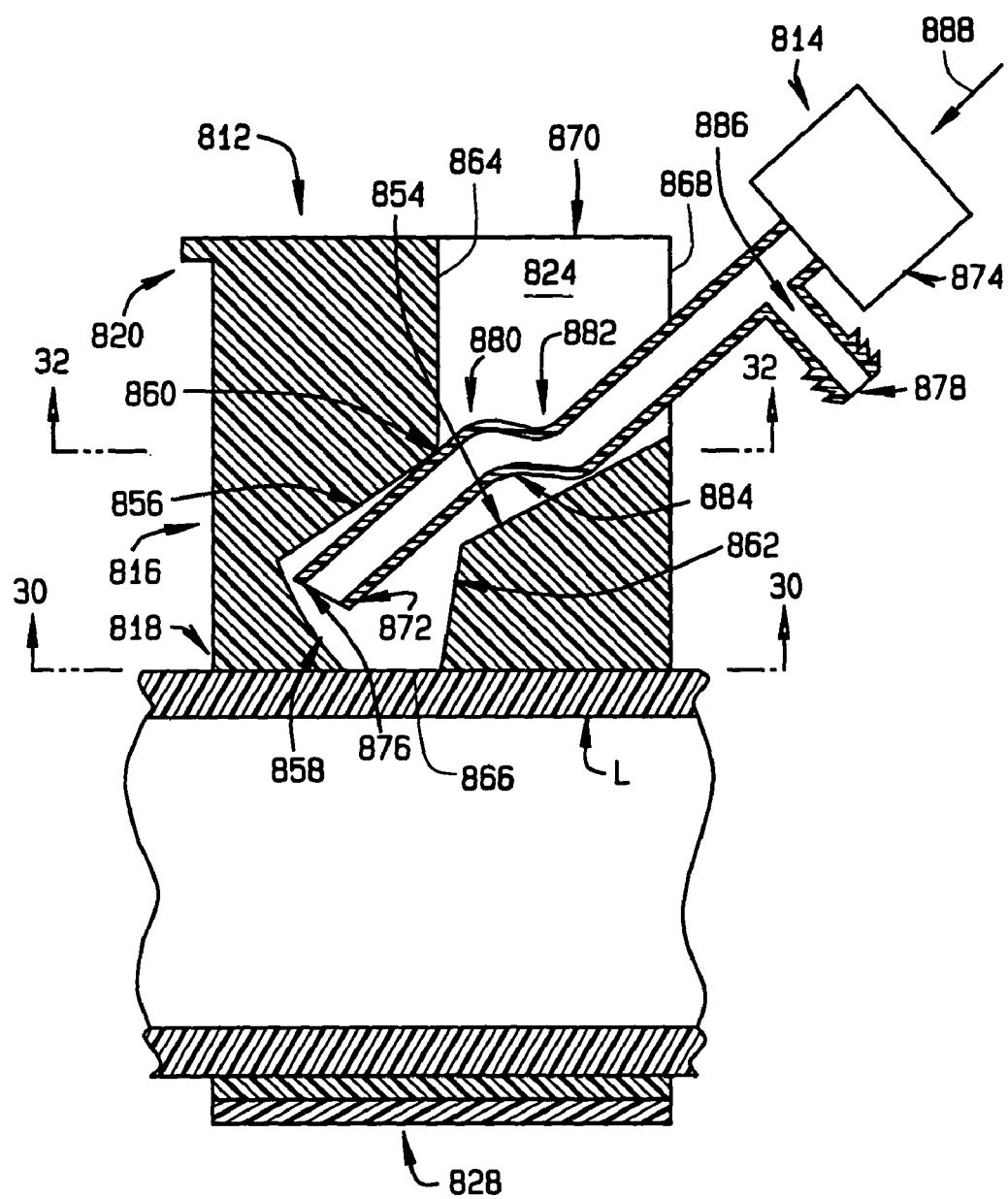
FIG. 27 is a cross sectional view of a saddle tee and tap in accordance with a preferred embodiment of the present invention shown with the tap at an initial stage of the connection to the irrigation line.
Figure 28:
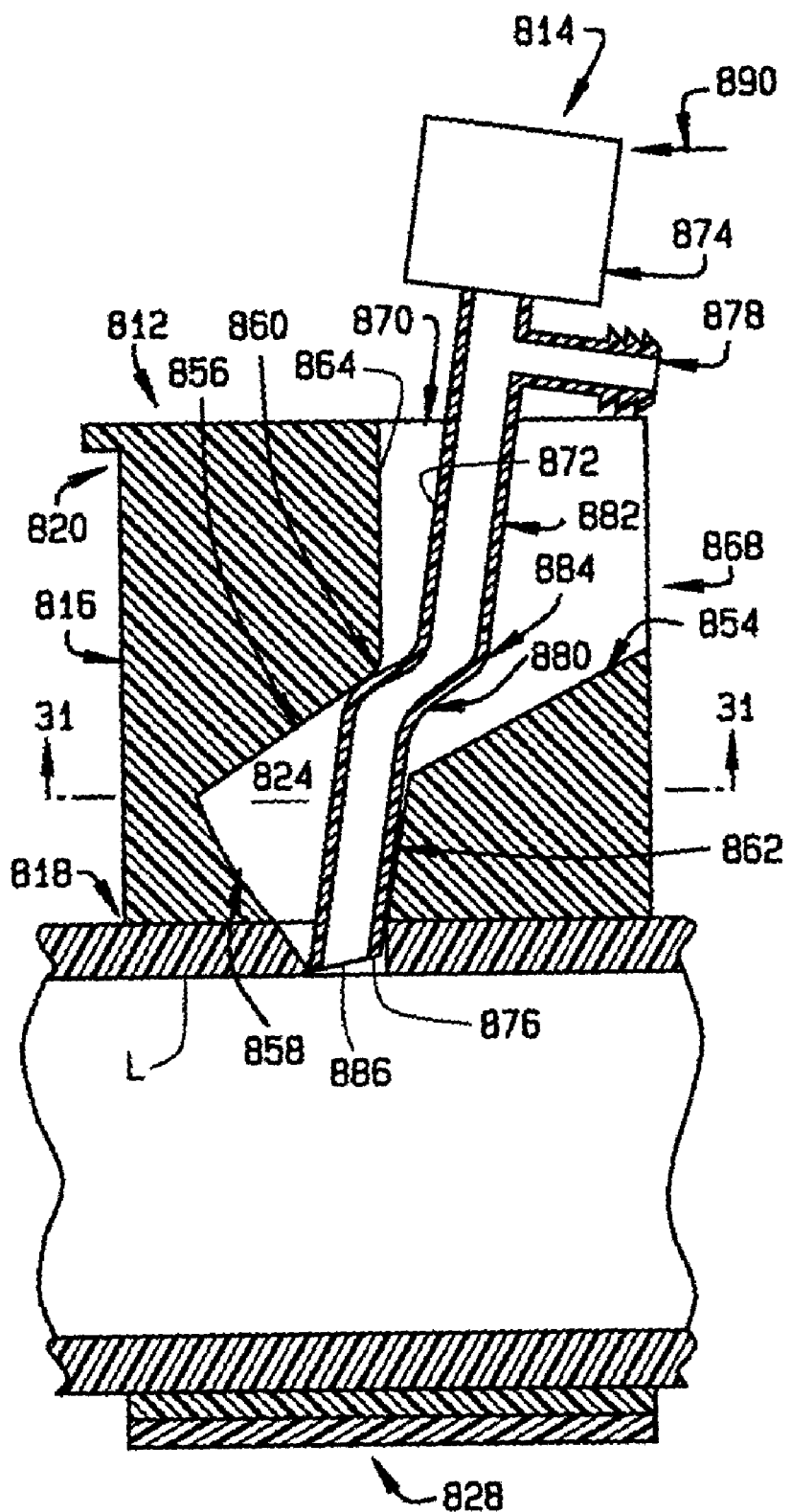
FIG. 28 is a cross sectional view of the saddle tee and tap of FIG. 27 shown with the tap at an intermediate stage of the connection to the irrigation line.
Figure 29:
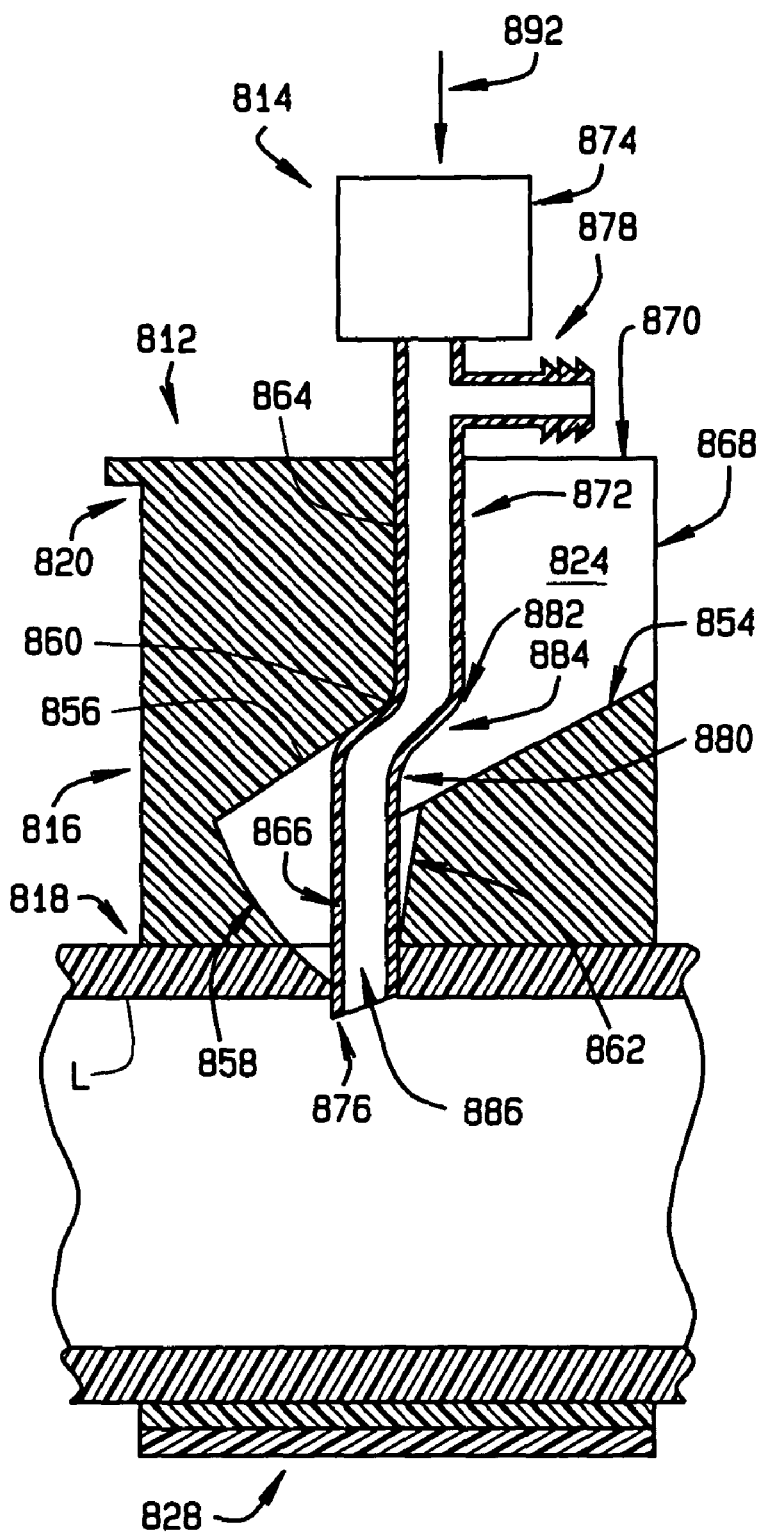
FIG. 29 is a cross sectional view of the saddle tee and tap of FIG. 27 shown with the tap at the final stage of the connection to the irrigation line.

Now with reference to FIGS. 27 to 32, a no-twist embodiment of a saddle tee 812 and tap 814 in accordance with the principles of the present invention may be seen. More particularly, FIGS. 27 to 29 show the saddle tee 812 installed on the irrigation line L and the tap 814 at an early, intermediate, and final stage, respectively, of the connection to the irrigation line L.

Figure 30:
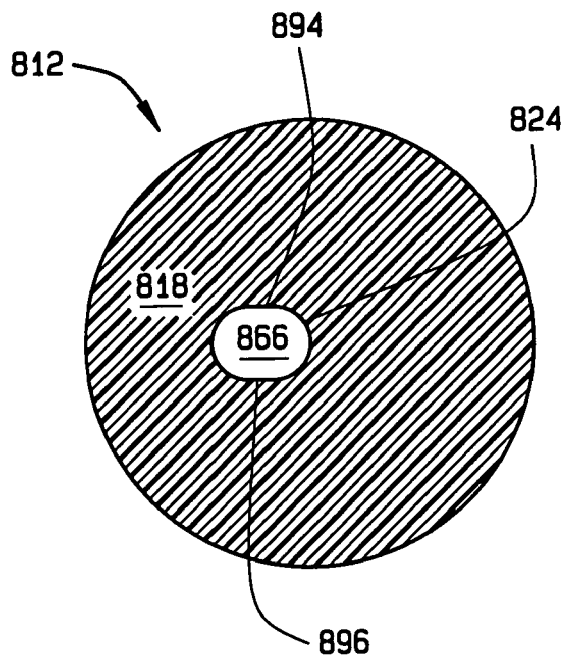
FIG. 30 is a cross sectional view of the saddle tee of FIG. 27 taken along the line 30—30 in FIG. 27 showing the shape of the passage.
Figure 31:
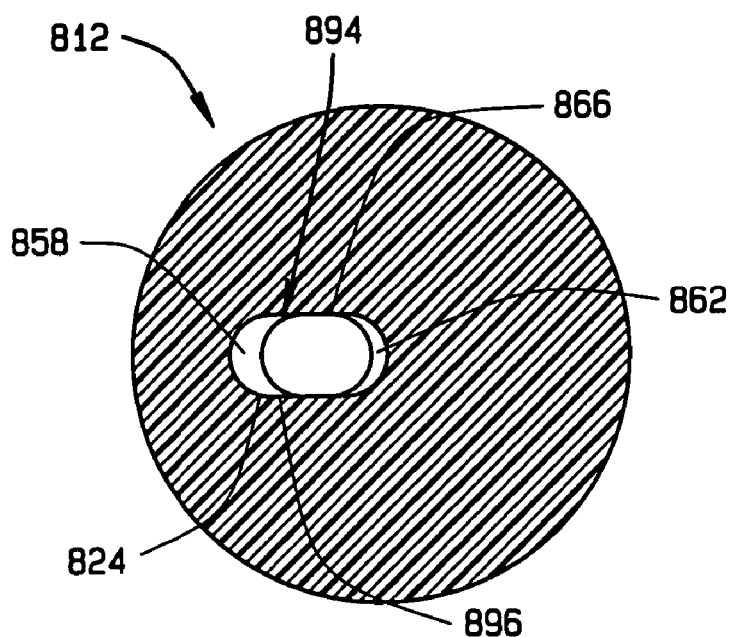
FIG. 31 is a cross sectional view of the saddle tee of FIG. 27 taken along the line 31—31 in FIG. 28 showing the shape of the passage.
Figure 32:
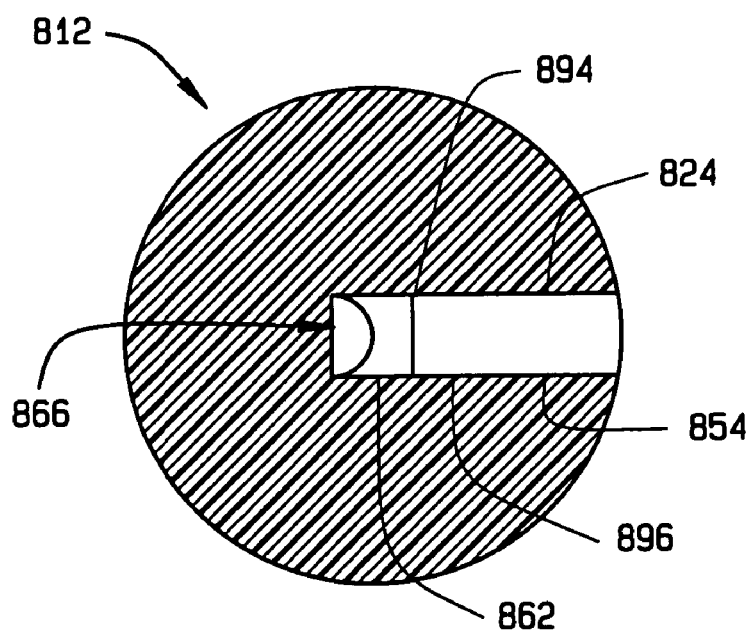
FIG. 32 is a cross sectional view of the saddle tee of FIG. 27 taken along the line 32—32 in FIG. 27 showing the shape of the passage.

The saddle tee 812 includes a body 816 with a first end 818 and a second end 820 and a first passage 824 therebetween. At the first end 818 a clamp 828 secures the saddle tee 812 to the irrigation line L. The tap 814 cooperates with the passage 824 to puncture the wall of the irrigation line L. In particular, the passage 824 includes two ramps 854 and 856, a curve or arc 858, a fulcrum 860, an inclined wall 862, and a vertical wall 864. As shown in FIGS. 30 to 32, openings 866, 868, and 870 also define the passage 824.

Turning now to the tap 814, the tap includes a curved member 872 and a handle 874. Additionally, the tap 814 may have a cutting tip 876, a fitting 878, a pair of curves 880 and 882 which turn in complimentary directions, and a length 884 between the two curves 880 and 882. Through the curved member 872 a passageway 886 connects the cutting tip 876 at the distal end of the tap 814 to the fitting 878 at, or near, the proximal end of the curved member 872.

In operation, the saddle tee 812 and tap 814 cooperate as follows to allow a user to make a connection to the irrigation line L. First, the tap 814 is inserted into the passageway 824 via openings 868 or 870 as indicated by an arrow 888. As can be seen in FIG. 27, the ramps 854 and 856 allow enough space between them for the insertion of the tap 814. Following the initial insertion the tap 814 is at a position where the cutting tip 876 is near the arc 858 and the distal end of the tap 814 extends along and partly beyond the ramp 856.

Next, the user pushes against the handle 874 causing the tap 814 to pivot about the fulcrum 860 along the distal end of the tap 814. Accordingly, the cutting member 876 swings down generally along the arc 858. When the cutting tip 876 encounters the wall of the irrigation line L the user continues pushing on the handle 874 in the direction indicated by arrow 890 in FIG. 28. Note that the cutting tip 876 may be angled so that the cutting tip 876 engages the wall at an angle (not shown) or along the entire circumference of the cutting tip 876. As the user pushes in the direction 890, the cutting tip 876 penetrates and punctures the wall of the irrigation line L.

Because of the fulcrum 860, against which the distal end of the curved member 872 presses, the strength of the user is multiplied by the lever ratio of the tap 814. Thus, irrigation lines L of high strength material, such as PVC, may be easily punctured. Accordingly, even users of relatively low strength or size may use the saddle tee 812 and tap 814 of the present invention. Additionally, users may make quicker connections while tiring less by using the saddle tee and tap according to the present invention.

In the alternative, a user may bring the tap 814 flush against the wall 864 as shown generally in FIG. 29, but without puncturing the wall via the fulcrum. Rather the user may push down (as indicated by arrow 62) on the handle 874 to cause the distal end 876 to puncture the wall. Whether the user pushes in direction 60 (FIG. 28) or pushes down (FIG. 29) the tap 814 punctures the wall of the irrigation line L.

Once the wall has been punctured, the ramp 856 and length 884 of the curved member 872 abut each other and prevent pressure within the line L from pushing the tap 814 from the connection. Additionally, the walls 862 (shown as a vertical wall in FIG. 29) and 864 prevent lateral movement of the tap 814 in the direction of the length of the irrigation line L. Likewise, walls 894 and 896, shown in FIGS. 30 to 32, prevent lateral movement of the tap 814 in the direction across the length of the irrigation line L. Thus, the slot like nature of the passage 824 prevents lateral movement of the tap 814.

In FIG. 30, a cross sectional view of the saddle tee 812 is seen as taken along the line 30—30 in FIG. 27. Opening 866 may be seen in the first end 818 of the saddle tee 812. In particular opening 866 is seen as a generally oblong shape. The oblong shape of opening 866 allows for a connection to be made by pushing generally horizontally (direction 890 in FIG. 28) on the handle 874. As the user pushes to the left on the handle 874, the cutting tip 876 will move right across the length of the oblong opening 866 thereby engaging and puncturing the irrigation line L. The oblong opening 866 also allows a user to seat the curved member 872 along the walls 862 and 864, as previously described, and then push down to make the connection. In the alternative, the opening 866 could be generally circular. A circular opening 866 allows for a connection to be made by pushing down on the handle 874 as described.

In summary, the embodiments of this invention variously make it faster and easier to make connections with fluid lines; and can result in more leak-resistant connections. Various embodiments of this invention provide self and pressure energized seals. Moreover, various embodiments of the present invention allows irrigation lines to be installed with less trenching and at less depth than previously possible. Lastly, because of these advantages, various embodiments of the invention reduces the cost of installing irrigation systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A saddle tee and tap combination for making a fluid connection with an irrigation line,
   the tee comprising a base including a passageway having an internal thread, and a clamp on an end of the base for engaging the irrigation line generally in alignment with the passageway;
   the tap comprising a body including an external thread thereon to engage the internal thread on the saddle tee, and a tip projecting from the body to penetrate the irrigation line and including a thread thereon to engage the wall of the irrigation line and an opening to allow fluid communication with the exterior of the irrigation line.

2. The saddle tee and tap combination of claim 1 wherein the clamp is adapted for compressing the irrigation line to elongate the cross-sectional profile in a direction aligned with the passageway in the base, and the tip of the tap terminates in a blunt point having a radius of curvature configured to form a coupon that remains hingedly attached to the irrigation line wall.

3. The combination according to claim 2 wherein the clamp comprises first and second arms, a first jaw hingedly connected to the first arm; a second jaw hingedly connected to the second arm, and wherein the first jaw overlaps and engages the second jaw to close the clamp.

4. The combination according to claim 3 wherein the clamp closes around an irrigation line and the jaws engage when the saddle tee is pressed against the irrigation line with no more than about thirty pounds of force.

5. The combination according to claim 3 wherein the first jaw has first and second ends, and a generally arcuate configuration, with a concave inner surface for engaging a portion of the irrigation line, and the second jaw has first and second ends, and a generally arcuate configuration, with a concave inner surface for engaging a portion of the irrigation line.

6. The combination according to claim 5 wherein the thickness of the arms generally tapers from the proximal end adjacent the base to their distal end.

7. The combination according to claim 6 wherein the jaws are hingedly mounted to their respective arms intermediate their ends.

8. The combination according to claim 7 wherein the length of the jaw between the first end and the hinge connection is at least about one-third of the distance between the arms.

9. The combination according to claim 8 wherein the length of the jaw between the first end and the hinge connection is at least about 0.4 inches.

10. The combination according to claim 2 wherein the closed clamp defines a dimension L2 aligned with the passageway, and a dimension L1, perpendicular to L2, and wherein L2 is greater than L1.

11. The combination according to claim 2 wherein the clamp comprises first and second arms, a first jaw hingedly connected to the first arm; a second jaw hingedly connected to the second arm, the first and second jaws adapted to be connected to close the clamp, the maximum transverse dimension between the jaws being less than the diameter of the irrigation line.

12. The combination according to claim 11 wherein the dimension of the clamp parallel to the passageway is greater than the diameter of the irrigation line.

13. The combination according to claim 12 wherein the dimension of the clamp parallel to the passageway is greater than a maximum transverse dimension between the jaws.

14. The combination according to claim 2 wherein the arms are at least 0.5 inches long.

15. The combination according to claim 14 wherein the arms are between about 0.6 and about 0.7 inches long.

16. The saddle tee and tap combination of claim 1 wherein the base having first and second ends, a and the passageway therebetween, and the clamp being on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the clamp self-closing around an irrigation line when the saddle tee is urged against the irrigation line with at least 30 pounds of force.

17. The saddle tee and tap combination of claim 1 wherein the base having first and second ends, and the passageway therebetween, and the clamp being on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the arms being at least 0.5 inches long.

18. The saddle tee and tap combination of claim 1 wherein the base having first and second ends, and a and the passageway therebetween, and the clamp being on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the portion between the first end of each jaw and the hinged connection with its respective arm being at least about 0.4 inches.

19. The saddle tee and tap combination of claim 1 wherein the base having first and second ends, and the passageway therebetween, and the clamp being on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the portion between the first end of each jaw and the hinged connection with its respective arm being at least about one third of the distance between the arms.

20. The saddle tee and tap combination of claim 1 wherein the base having first and second ends, and the passageway therebetween, and the clamp being on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the jaws contact between about ⅔ and about ¾ of the circumference of the irrigation line.

21. The saddle tee and tap combination according to claim 1 wherein the tap has a flange that engages the wall of the irrigation line surrounding the puncture made by the tip.

22. The saddle tee and tap combination of claim 1 wherein the tip terminates in a point with an angle greater than about 70°.

23. The saddle tee and tap combination according to claim 22 wherein the tip terminates in a point with an angle of between about 70° and about 85°.

24. The saddle tee and tap combination of claim 1 wherein the tip includes a cutting member configured for penetrating the irrigation line and making fluid communication with the irrigation line; the cutting member having at least one beveled edge that causes a coupon to be formed from and connected to the line wall.

25. The connection according to claim 24 wherein the saddle tee is oriented so that a passageway extends generally horizontally.

26. The saddle tee and tap according to claim 1 wherein a distance between the thread on the tip increases toward the body.

27. The saddle tee and tap according to claim 1 wherein the pitch of the thread on the tip is greater than the pitch of the thread on the body.

28. The saddle tee and tap according to claim 1 further comprising a seal adjacent the body and to be compressed by the wall of the irrigation line and the body.

29. The saddle tee and tap according to claim 1 further comprising the opening being located near the distal end of the tip.

30. The saddle tee and tap combination of claim 1 wherein the tap includes a shoulder to match the contour of the wall near the penetration.

31. The saddle tee and tap combination of claim 1 wherein the clamp is adapted for holding the irrigation line in alignment with the passage, and compressing the irrigation line into a generally oval cross-section elongated in the direction of the axis of the passageway; and the tip of the tap is adapted to be inserted into the passageway and adapted for scoring around an area of and penetrating the wall of the irrigation line engaged in the clamp, in the direction of the elongation of the cross section.

32. The saddle tee and tap combination according to claim 31 wherein the tap having a flange that engages the wall of the irrigation line surrounding the puncture made by the tip.

33. The saddle tee and tap combination according to claim 32 further comprising a seal adjacent the flange adapted to be compressed between the flange and the irrigation line to form a seal therebetween.

34. The saddle tee and tap combination of claim 1 wherein the tap includes a base and the tip extending from the base base and includes a shoulder adjacent a junction of the tip with the tap base, the shoulder having a longitudinal contour configured to stretch an opening in and form a seal with the irrigation line.

35. The fluid connection according to claim 34 wherein the contour is curved.

36. The saddle tee and tap combination of claim 1 wherein the base includes first and second ends, and the passageway therebetween, and the clamp is on the second end for engaging the irrigation line generally in alignment with the passageway through the base, the clamp comprising first and second spacers extending from the base, a first jaw, having first and second ends, hingedly connected to the first spacer intermediate the first and second ends of the first jaw; a second jaw, having first and second ends, hingedly connected to the second spacer intermediate the first and second end of the second jaw, and wherein the second ends of the first and second jaws overlap and engage each other to close the clamp, the spacers spacing the jaws sufficiently from the second end of the base to permit debris to pass through the passage when an irrigation line is engaged in the clamp.

37. The saddle tee according to claim 36 wherein the spacers are between about are at least 0.5 inches long.

38. The saddle tee according to claim 37 wherein the spacers are between about 0.6 and 0.7 inches long.

39. A tap for use with a saddle tee, the tee to be secured on an irrigation line to make a fluid connection with the irrigation line, the tee including an internal thread, the tap comprising:

a body including an external thread thereon to engage the internal thread on the saddle tee, and a tip projecting from the body to penetrate the irrigation line and including a thread thereon to engage the wall of the irrigation line and an opening on an unthreaded portion of the tip to allow fluid communication with the exterior of the irrigation line; the body having a diameter wider than a widest diameter of the tip.

40. The tap according to claim 39 wherein the pitch of the threads on the tip increases toward the body.

41. The tap according to claim 39 wherein the pitch of at least a portion of the threads on the tip is less than the pitch of the threads on the body.

42. The tap according to claim 39 further comprising a seal adjacent the body and to be compressed by the wall of the irrigation line and the body.

43. The tap according to claim 39 further comprising the opening being located near the distal end of the tip.

44. The tap according to claim 39, the tap further comprising a shoulder between the tip threads and the external threads, the shoulder having a diameter which increases with distance from the tip threads to stretch an opening in the wall.

45. The tap according to claim 44 wherein a wall of the irrigation line to assume a contour when the fluid connection is made, the shoulder further comprising a contour to substantially match the contour of the irrigation line wall.

46. The tap according to claim 45 further comprising the increasing in diameter being monotonic.

47. The tap according to claim 45 further comprising the shoulder defining an arc.

48. The tap according to claim 39 further comprising the tip thread circling the tip less than about two times.

49. The tap according to claim 39 further comprising the tee to be secured on the irrigation line by at least one clamp.

50. The tap of claim 39 wherein the tip includes a blunt point having a radius of curvature greater than about 0.05 inches and is adapted for forming a coupon that remains hingedly attached to the irrigation line wall.

51. The tap according to claim 39 further comprising the saddle tee having:

a base including a passageway that includes the internal thread; and a clamp on an end of the base for engaging the irrigation line generally in alignment with the passageway.

52. The tap of claim 39, further including a shoulder adjacent a junction of the tip with the body, the shoulder having a longitudinal contour configured for stretching an opening in and forming a seal with the irrigation line.

53. The tap of claim 39 wherein the tip terminates in a point with an angle greater than about 70°.

54. The tap of claim 53 wherein the tip terminates in a point with an angle of between about 70° and about 85°.

55. The tap of claim 39 wherein the tip includes a cutting member configured for penetrating the irrigation line and making fluid communication withe irrigation line.

56. The tap of claim 55, wherein the cutting member includes at least one beveled edge that causes a coupon to be formed from and connected to the line wall.

57. The tap of claim 39 wherein the tip of the tap is adapted for scoring around an area of and penetrating the wall of the irrigation line.

58. The tap of claim 39 wherein the tip includes a cutting member having one or more cutting edges arranged to define an area around which the cutting member is configured to cut.

* * * * *